United States Patent
Straw et al.

(10) Patent No.: US 8,674,824 B1
(45) Date of Patent: Mar. 18, 2014

(54) SONAR SENSOR ARRAY AND METHOD OF OPERATING SAME

(75) Inventors: Timothy B. Straw, Narragansett, RI (US); Michael J. Obara, North Kingstown, RI (US); Stephen A. Caldwell, Warren, RI (US)

(73) Assignee: The United States of America as represented by the Secretary of the Navy, Washington, DC (US)

( * ) Notice: Subject to any disclaimer, the term of this patent is extended or adjusted under 35 U.S.C. 154(b) by 18 days.

(21) Appl. No.: 13/567,306

(22) Filed: Aug. 6, 2012

(51) Int. Cl.
*G08B 1/08* (2006.01)

(52) U.S. Cl.
USPC ....... 340/539.1; 340/573.1; 367/93; 367/125; 367/135

(58) Field of Classification Search
USPC ........ 340/539.1, 573.1, 309.16, 10.33, 10.34; 367/90, 93, 120, 124, 125, 135; 364/602, 607
See application file for complete search history.

(56) References Cited

U.S. PATENT DOCUMENTS

| | | | | |
|---|---|---|---|---|
| 4,454,597 A | * | 6/1984 | Sullivan | 367/12 |
| 4,491,930 A | * | 1/1985 | Hyatt | 708/3 |
| 5,053,983 A | * | 10/1991 | Hyatt | 708/306 |
| 6,473,363 B1 | * | 10/2002 | Oetzmann | 367/120 |
| 7,012,854 B1 | * | 3/2006 | Lo | 367/135 |

\* cited by examiner

*Primary Examiner* — Hung T. Nguyen
(74) *Attorney, Agent, or Firm* — James M. Kasischke; Michael P. Stanley

(57) ABSTRACT

A sonar sensor array is provided that has reduced power consumption, data bandwidth and data storage requirements. The sensor array may be configured to a sleep mode, low-resolution mode and high-resolution mode. In the sleep mode, all sonar sensors are configured in the sleep mode and no acoustic signals are detected. In the low-resolution mode, a limited number of sonar sensors are powered and acoustic signals received by the sonar sensors are processed with reduced bandwidth and reduced dynamic range, and then stored on a data storage device. In the high-resolution mode, the acoustic signals detected by the sonar sensors are processed with full signal bandwidth and full dynamic range and then stored on the data storage device.

18 Claims, 3 Drawing Sheets

|  | LEGACY MODE (PRIOR ART) | LOW-RESOLUTION | HIGH-RESOLUTION |
|---|---|---|---|
| CHANNELS | ALL CHANNELS ACTIVE | 5:1 REDUCTION IN ACTIVE CHANNELS | ALL CHANNELS ACTIVE |
| DATA | 24 BIT | 8 BIT | 24 BIT |
| BANDWIDTH | 500 HZ | 100 HZ | 500 HZ |
| SAMPLE RATE | 1250 SPS | 250 SPS | 1250 SPS |
| DURATION | 24 HOURS | 24 HOURS - 100 SECONDS | 100 SECONDS |
| POWER CONSUMPTION | 100% | 10% | 100% |
| DATA RATE | 40 KB/SEC. | 0.73 KB/SEC | 40 KB/SEC. |
| DATA COLLECTED | 3398 MB | 61.7 MB | 3.9 MB |

FIG. 3

SONAR SENSOR ARRAY AND METHOD OF OPERATING SAME

STATEMENT OF GOVERNMENT INTEREST

The invention described herein may be manufactured and used by or for the Government of the United States of America for governmental purposes without the payment of any royalties thereon or therefor.

CROSS REFERENCE TO OTHER PATENT APPLICATIONS

None.

BACKGROUND OF THE INVENTION (1) Field of the Invention

The present invention generally relates to sonar sensor arrays and more particularly, to a sonar sensor array that has reduced power consumption, bandwidth and data storage requirements.

(2) Description of the Prior Art

Acoustic sonar sensors are used for many purposes and in a variety of environments. For example, acoustic sonar sensors are used on surface ships and also in underwater applications such as line arrays, submarines and unmanned undersea vehicles. Such acoustic sensors are used to detect ships, marine life, marine geology, and other underwater sound sources.

The acoustic sonar sensors are typically fixed in either a linear arrangement or in a structure that conforms to a hull of a host vehicle. Current acoustic and other type sonar sensors require a fixed amount of power to operate with the result of a fixed measurement data rate for a given application. In some applications, the measured signal of interest is present for relatively short periods of time followed by relatively long periods of time in which there is no signal of interest.

Sonar sensor arrays that are configured to continuously acquire and record sensor data consume significant amounts of electrical power and utilize large amounts of available memory. In such sonar sensor arrays, all of the sensors are constantly powered since signal monitoring continuously occurs. Therefore, such sensor arrays can be very inefficient with the result of limited operating time for battery-powered systems wherein a finite amount of electrical energy is available for a given mission. Furthermore, these existing prior art sonar sensor arrays are constricted by a data playback bottleneck such that only a limited amount of playback bandwidth is available for the specific application or mission.

What is therefore needed is a sonar sensor array that addresses the problems of the aforementioned prior art sonar sensor arrays and utilizes significantly less power, bandwidth and data storage.

SUMMARY OF THE INVENTION

Accordingly, it is a general purpose and primary object of the present invention to provide a sonar sensor array that addresses the foregoing deficiencies and disadvantages of prior art sonar sensor arrays.

It is a further object of the present invention to maximize the efficiency of the limited energy storage of battery powered sonar sensor arrays while compensating for limited playback bandwidth.

To attain the objects described, the present invention is directed to a sonar sensor array that utilizes significantly less electrical power, bandwidth and data memory. The sonar sensor array may be configured in any one of three operational modes depending on the environmental conditions and programmed system parameters.

A first mode of the three modes is a sleep mode in which all sonar sensors are turned off (not powered) and no monitoring of acoustic signals occurs. The sleep mode is used when there are significantly long periods of time between appearances of targets. A second mode is a low-resolution mode in which a limited number of sonar sensors are activated and acoustic signals are sampled and digitized using reduced bandwidth and dynamic range. One alternate embodiment is related to the functions in the signal processor versus the electronic circuits. Quite often the digitization of acoustic signals can occur in the electronic circuits.

Digitized acoustic signal data is stored on a data storage device. A third mode is a high-resolution mode in which all sonar sensors are activated and acoustic signals are sampled and digitized with full bandwidth and full dynamic range. The digitized acoustic signal data is then stored in a data storage device.

In one embodiment, the sonar sensor array cycles between the low-resolution mode and the high-resolution mode wherein processing of the high-resolution mode does not occur unless processing of the low-resolution determines the presence of a target of interest. In another embodiment, the sonar sensor array cycles between the sleep mode and high-resolution mode. In such an embodiment, the sonar array system remains in the sleep mode for a predetermined amount of time until acoustic energy is detected in which case the sonar sensor array immediately shifts into high-resolution mode signal processing. Thus, the present invention is directed to a sonar sensor array that comprises a plurality of sonar sensors, wherein each sensor can be configured to a powered mode in which the sensor detects acoustic signals or to a sleep mode in which the sensor receives no electrical power and does not detect acoustic signals.

The sensor array further comprises a data acquisition device having a signal processor and a data storage device. The signal processor samples and digitizes the acoustic signals received by the sonar sensors and the digitized signal data is stored on the data storage device. The data acquisition device is configured to operate in a low-resolution mode of signal processing in which acoustic signals received by the sonar sensors are processed by the signal processor at a reduced bandwidth and dynamic range, and then stored on the data storage device. The acquisition device is also configured to operate in a high-resolution mode in which the acoustic signals received by the sonar sensors are processed at full signal bandwidth and dynamic range and then stored on the storage device.

The sonar array system further comprises a control circuit for configuring the sensors to the sleep mode or to the powered mode. The control circuit also configures the data acquisition device to the low-resolution mode or to the high-resolution mode depending upon the amplitude level of the detected acoustic signals and whether the acoustic signals indicate the presence of a target of interest. During the low-resolution mode, the control circuit configures a limited number of sonar sensors to the powered mode. During the high-resolution mode, the control circuit configures all of the sonar sensors to the powered mode.

An important feature of the present invention is the utilization of known and particular characteristics of the acoustic signals and noise being measured in order to vary the operational modes of the data acquisition device.

BRIEF DESCRIPTION OF THE DRAWINGS

A more complete understanding of the invention and many of the attendant advantages thereto will be appreciated as the same becomes better understood by reference to the following detailed description when considered in conjunction with the accompanying drawings wherein corresponding reference characters indicate corresponding parts throughout the several views of the drawings and wherein:

FIG. 3 is a chart of the differences between a prior art system and the sonar sensor array of the present invention.

DETAILED DESCRIPTION OF THE INVENTION

Figure 1:
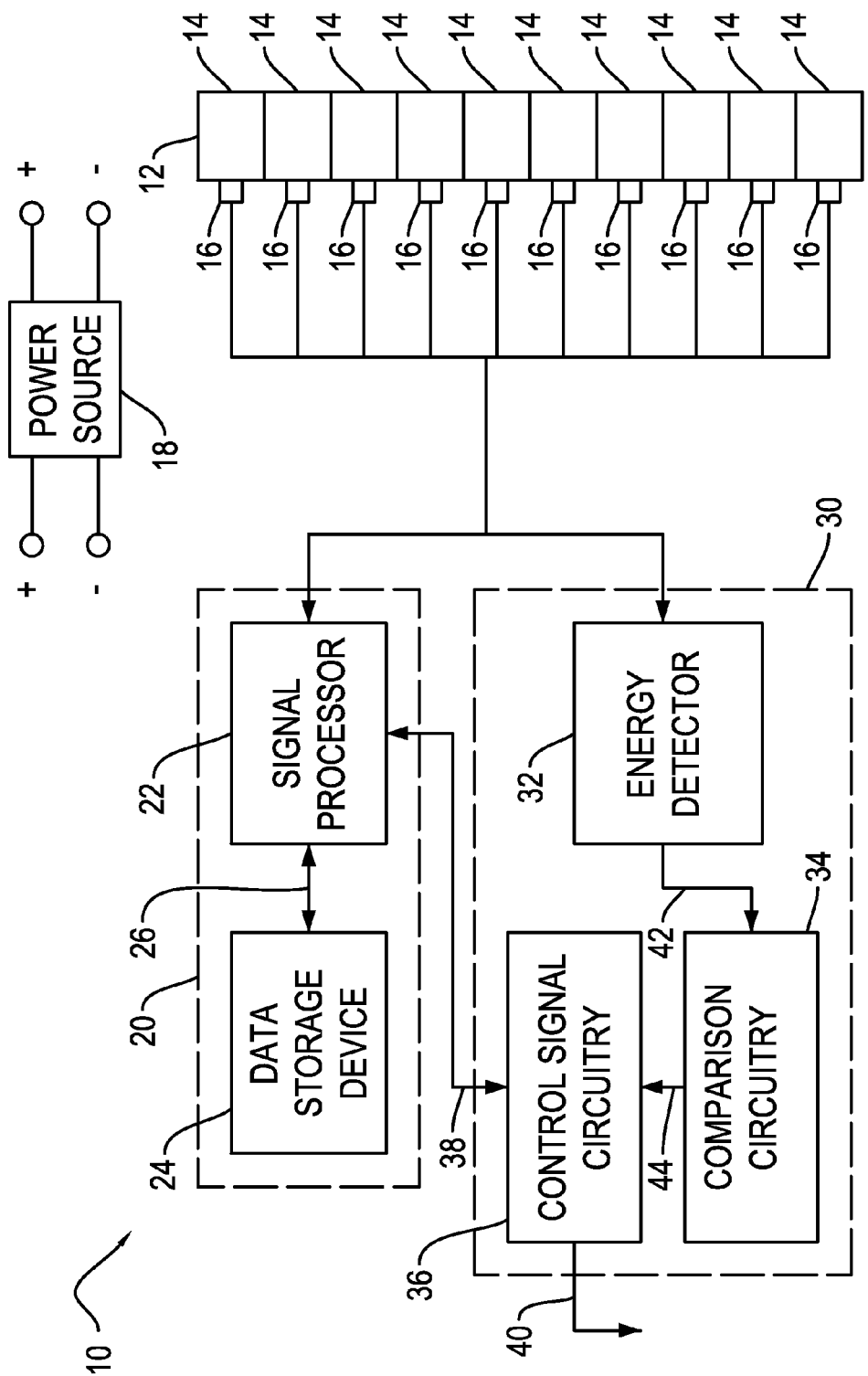
FIG. 1 depicts a block diagram of a sonar sensor array in accordance with one embodiment of the present invention.

Referring to FIG. 1, there is shown a sonar system 10 in accordance with one embodiment of the present invention. The system 10 comprises a line array 12 that has a plurality of sonar sensors 14. Each sensor 14 has a corresponding electronic circuit 16 that contains a switch that, when closed, allows electrical power to be applied to the sensor so as to activate the sensor. When the sensor 14 is activated, the sensor is in the powered mode. When the switch is open, electrical power is removed from the sensor 14; thereby, turning off the sensor. In use, the array of sonar sensors 14 could be a line array or the array of sonar sensors could be a planar array.

When the sensor 14 is off or deactivated, the sensor is in the sleep mode. Each electronic circuit 16 is capable of receiving a control signal that allows the switch to configure the corresponding sensor to the sleep mode or to the powered mode. Each electronic circuit 16 also includes an output port for providing the acoustic signals sensed by the sonar sensor 14. A power source 18 provides electrical power to the circuits 16 and other components of the sonar sensor array 10. The power source 18 is typically a battery of fixed capacity.

The sonar sensor array 10 further comprises a data acquisition device 20 which samples, digitizes and records acoustic signals received from the sonar sensors 14. The data acquisition device 20 comprises a signal processor 22 and a data storage device 24. The signal processor 22 is in data signal communication with the data storage device 24 via a data bus 26. The signal processor 22 samples and digitizes acoustic signals.

In one embodiment, the signal processor 22 is programmed with algorithms such as Fast Fourier Transform or Discrete Fourier Transform. The data storage device 24 may be a non-volatile memory or other suitable memory device. In a preferred embodiment, the data storage device 24 includes pre-stored data relating to known target signatures or target characteristics. In such an embodiment, the signal processor 22 compares recently processed acoustic signals with stored data that relates to known target signatures in order to determine if a particular target is or has been in the environment.

The data acquisition device 20 can be configured to a sleep mode in which some circuitry of the data acquisition device 20 is disabled to reduce electrical power consumption. In the sleep mode, no signal processing occurs and thus, no data storage space of the data storage device 24 is used. When the data acquisition device 20 is configured to the sleep mode, all sonar sensors 14 are configured to the sleep mode with the result of significantly reducing power consumption.

The data acquisition device 20 can be configured to operate in a high-resolution mode. In the high-resolution mode, all channels (i.e., all sonar sensors 14) are in the active or powered mode and the signal processor 22 samples and digitizes acoustic signals with full signal bandwidth and full dynamic range. All data is then stored to the data storage device 24 for later playback.

The data acquisition device 20 can be configured to a low-resolution mode. In the low-resolution mode, the electrical power and data record bandwidth are significantly reduced. In this mode, only a limited number of the sonar sensors 14 are in the powered mode. In one embodiment of the low-resolution mode, the signal bandwidth is reduced by reducing the signal sample rate, for example, by a factor of 5:1. In another embodiment of the low-resolution mode, a second data rate reduction is effected by compressing the amplitude scale of the measurement, for example by converting 24-bit linear to 8-bit compounded resolution. This achieves a reduction factor of 3:1 in data rate.

The combination of reduced bandwidth and reduced amplitude resolution has an improvement in reduced data rate by a factor of 15:1 compared to the high-resolution mode. In the low-resolution mode, data volume is also further reduced by the utilization of only a limited number of the sonar sensors 14 in the powered mode. This is because a line array of sensors is typically designed with a physical spacing related to the upper design frequency of interest. The sonar sensor array system 10 can be configured so that only every third, or every fourth, or every fifth, etc. one of the sonar sensors 14 is configured to the powered mode while the remaining sonar sensors are configured to the sleep mode. The reduction in signal bandwidth (by a factor of 5:1 by reducing the sampling rate in combination with using a limited number of powered sensors) results in an aggregate data-rate reduction factor of 45:1 to 75:1.

The low-resolution mode may be implemented by simultaneously reducing the sampling rate and compressing the amplitude scale of measurement. The signal processor 22 is programmable and can be configured to the sleep mode, low-resolution mode or high-resolution mode upon receipt of a signal from a control circuit 30. The sleep mode allows for a periodic time window between the high-resolution mode and the low-resolution mode, or between successive periods of high-resolution modes, in order to further reduce electrical power and is effective when the signal of interest is slowly varying over the time span of several cycles in the high-resolution mode, low-resolution mode and sleep mode.

The control circuit 30 comprises an energy detector 32, comparison circuitry 34 and control signal circuitry 36. A data bus 38 is in data signal communication with the signal processor 22 and the control signal circuitry 36. A data bus 40 is in data signal communication with the circuits 16 which are associated with the sonar sensors 14. The control signal circuitry 36 issues digital control signals by the data bus 38 to change the mode of the signal processor 22 to the sleep, low-resolution or high-resolution modes.

In a preferred embodiment, the control signal circuitry 36 is programmable and has a data storage device such as a read-only-memory or other type of non-volatile memory for storing pre-programmed sequences of operation. The control signal circuitry 36 also outputs digital control signals over the data bus 40 to configure the sonar sensors 14 to the sleep mode or to the powered mode. The energy detector 32 detects acoustic signals received by the powered sonar sensors 14 and outputs a signal waveform 42 that represents the detected acoustic signals.

In one embodiment, the energy detector 32 comprises a frequency-selective band-pass filter and an averaging circuit. The averaging circuit produces a slowly varying signal that is proportional to the input of the band-pass filter. The passband of the bandpass filter is adjusted to a band of frequencies associated with a target of interest.

The comparison circuitry 34 compares the amplitude level of the signal waveform 42 to a predetermined threshold level or reference voltage. If the amplitude level of the signal waveform 42 exceeds the threshold; then a target is present and the circuitry 34 issues a signal 44 to the control signal circuitry 36 that indicates a target is present. In response, the control signal circuitry 36 outputs a control signal over the data bus 38 that shifts the operation of the data acquisition device 20 to the high-resolution mode (in order to determine if a target signature is present) and outputs control signals over the data bus 40 to configure all sonar sensors to the powered mode.

If the amplitude level of the signal waveform 42 is less than or equal to the predetermined threshold; then a target is not present and the circuitry 34 outputs the signal waveform 42. The signal waveform 42 indicates a target is not present. In response, the control signal circuitry 36 outputs a control signal over the data bus 38 that maintains the data acquisition device 20 in the low-resolution mode and outputs control signals to maintain a predetermined number of sonar sensors 14 in the sleep mode.

In an alternate embodiment, the sonar sensor array 10 includes additional feedback circuitry to automatically adjust or vary the predetermined threshold level or reference voltage to account for variations in ambient noise levels.

If the sonar sensor array 10 is to be configured in the sleep mode, then the control signal circuitry 36 outputs a control signal over the data bus 38 that configures the data acquisition device 20 to the sleep mode and also outputs control signals over the data bus that configure all of the sonar sensors 14 to the sleep mode.

If the sonar array system 10 is to be used in a slowly varying environment where a target of interest may be expected to appear, the control signal circuitry 36 may be programmed to continuously cycle the data acquisition device 20 between the sleep mode and the low-resolution mode at an appropriate rate and duty cycle. In such an embodiment, the control signal circuitry 36 is programmed to periodically output control signals over the data bus 40 that powers a limited number of the sonar sensors 14.

The energy detector 32 monitors for a pre-programmed increase in acoustic signal levels. The low-resolution mode processes the acoustic signals to determine if a target of interest is actually present. If the target is present, the control circuit 30 automatically shifts the data acquisition device 20 into the high-resolution mode to make a more precise measurement of the characteristics of the acoustic signals in order to determine if a known target signature is present.

In one embodiment, the control circuit 30 is programmed to control the data acquisition device 20 so that the acquisition device cycles between the low-resolution and high-resolution modes without using the sleep mode. This embodiment is suited to environments that have slowly varying targets of interest which results in the maximum amount of relevant information being recorded but with a minimum of data volume.

Figure 2:
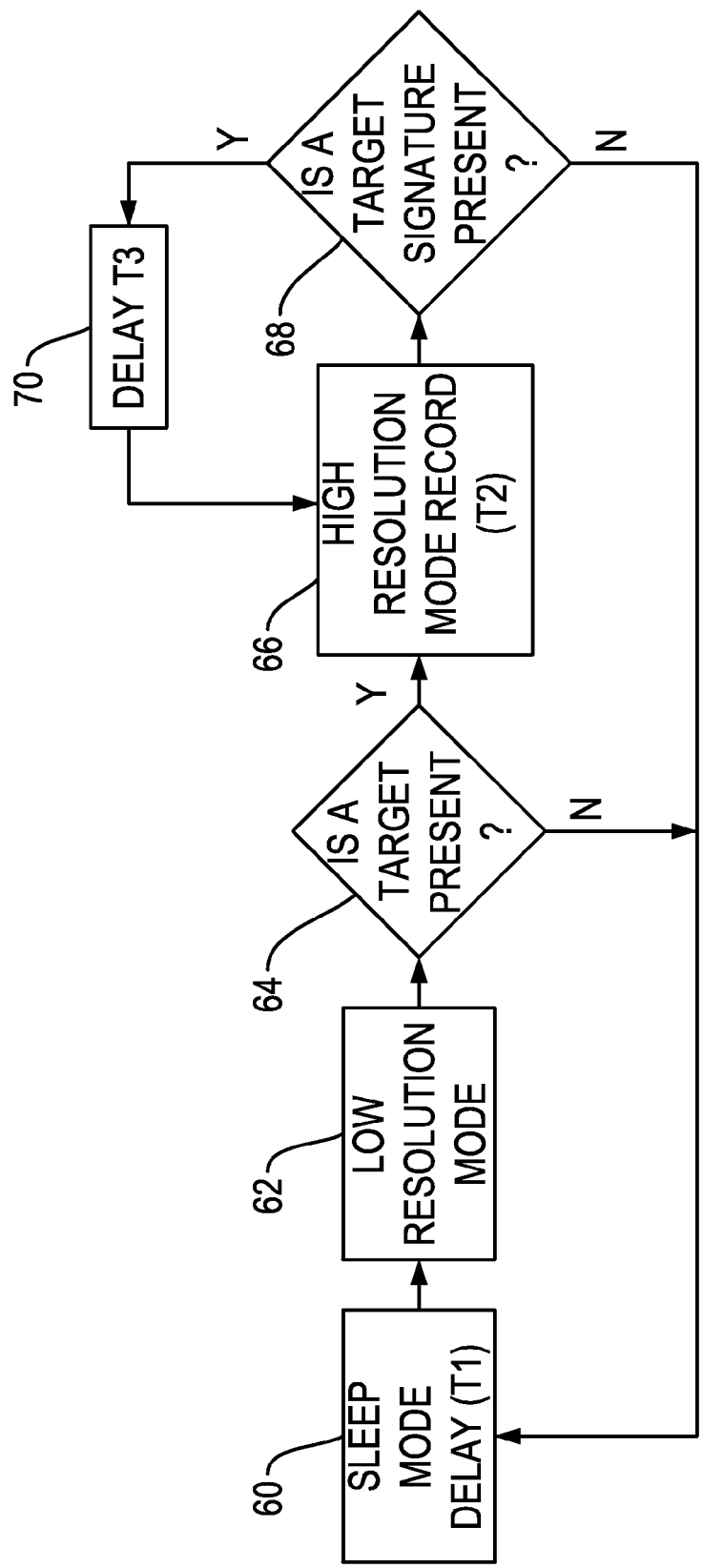
FIG. 2 depicts a flow chart of the operation of the sonar sensor array of FIG. 1.

Referring to FIG. 2, there is shown a flow chart that illustrates the operation of the sonar sensor array 10 in accordance with the invention. As a reference point, the data acquisition device 20 may be configured into the sleep mode numerous times during a period of operation (e.g., 24 hours, 48 hours, etc.). In step 60, all of the sonar sensors 14 and the data acquisition device 20 are in the sleep mode for a predetermined amount of time T1. Next, in step 62, after the time T1 elapses, the control signal circuitry 36 issues a control signal to power a limited number of the sonar sensors 14 and also issues a control signal to configure the data acquisition device 20 to the low-resolution mode.

If the energy detector 32 detects acoustic signals from the powered sonar sensors 14; the low-resolution mode processes these acoustic signals to determine if a target of interest is present. In step 64, if it is determined that a target of interest is not present, then the control signal circuitry 36 issues control signals that configure all of the sonar sensors 14 and the data acquisition device 20 to the sleep mode. If in step 64, it is determined that a target is present, then in step 66, the control signal circuitry 36 issues control signals to power all of the sonar sensors 14 and to configure the data acquisition device 20 to the high-resolution mode for a predetermined amount of time T2.

In the high-resolution mode, the acoustic signals received by the sonar sensors 14 are processed to determine if a target signature is present and then recorded. If in step 68, it is determined that a target signature is not present; the control signal circuitry 36 issues control signals that configure all of the sonar sensors 14 and the data acquisition device 20 to the sleep mode. If in step 68, it is determined that a target signature is present, then step 70 implements a predetermined time delay T3 and then returns to high-resolution mode processing in step 66. The high-resolution mode processing will continue for another time segment T2. After the predetermined time segment T2 elapses, step 68 again determines if a target signature is still present.

If a target signature is still present, then step 70 initiates another time delay T3. Thus, steps 66, 68 and 70 form a loop that continues until a target signature is no longer present; in which case the control signal circuitry 36 will shift the data acquisition device 20 and the sonar sensors 14 back to the sleep mode. The control signal circuitry 36 can be programmed to continuously cycle between the sleep mode and low-resolution mode until the processing of the low-resolution mode determines if a target of interest is present. In such an embodiment, steps 60, 62 and 64 are repeated until step 64 determines that a target is present, in which case high-resolution processing is implemented.

The control signal circuitry 36 may be programmed to cycle the sonar array system 10 between the sleep mode and the high-resolution mode. This embodiment is suitable when there are targets of interest that are infrequent and slowly moving. In this embodiment, the high-resolution mode is activated in an intermittent manner wherein data is recorded in short segments separated by time periods in which there is no data recording. This embodiment is useful in environments where there is a high signal-to-noise ratio. In such an embodiment, the control signal circuitry 36 maintains the sonar array system 10 in the sleep mode for a predetermined amount of time and then is configured to the high-resolution mode for a predetermined amount of time.

If the high-resolution mode processing detects a target signature, then the system will enter the loop defined by steps 66, 68 and 70. If the high-resolution processing does not detect a target signature, the control signal circuitry 36 configures the sonar sensors 14 and the data acquisition device 20 to the sleep mode. The control signal circuitry 36 will continue this pattern in accordance with a pre-stored program of operation.

The present invention is significantly more efficient than prior art sonar array systems. FIG. 3 depicts an example of the differences in operation between a prior art Legacy system and the sonar sensor array 10 for a twenty-four hour period. In this example, the control signal circuitry 36 cycles the modes of operation between the low-resolution and high-resolution modes. In the Legacy system, the system operates constantly for twenty-four hours, all channels (i.e., all sonar sensors) are constantly powered. The amplitude scale of measurement is always 24 bits, the bandwidth is constantly 500 Hz, the sample rate is constantly 1250 SPS (samples/second), the power consumption is 100% and the data rate is 40 KB/SEC (kilobytes per second).

At the end of the operational period, the Legacy system records 3398 MB of data. This inefficient performance is contrasted with the very efficient operation of the sonar sensor array 10. In this example, the sonar sensor array 10 is cycled between the low-resolution mode and the high-resolution mode. As will be apparent by the data shown in FIG. 3; the low-resolution mode detects a suspected target ten times per day and the high-resolution mode is activated only for a ten-second period for each target detected during the low-resolution mode.

In this example, the sonar sensor array 10 is configured such that the sleep mode is not used and the control signal circuitry 36 cycles the operation between the low-resolution mode and high-resolution mode depending upon how many times the low-resolution mode detects a suspected target. As shown in FIG. 3, the low-resolution mode operates over a twenty-four hour period as does the Legacy system, but the low-resolution mode operates at periodic intervals wherein the duration of each period of low-resolution processing is one-hundred seconds in duration.

The low-resolution mode is implemented when the control signal circuitry 36 detects acoustic signals from powered sonar sensors 14. A reduced number of the sonar sensors 14 are utilized in the low-resolution mode which yields a 5:1 reduction in active channels. The amplitude scale of measurement is eight bits, the bandwidth is 100 Hz and the sample rate is 250 SPS (samples/second). The power consumption in this mode is only ten percent of the power consumption of the prior art Legacy system. The resulting data rate is 0.73 KB/SEC and the amount of data actually recorded is 61.7 MB. If the low-resolution mode determines there is a target, then the control circuit 30 shifts the signal processing function to the high-resolution mode.

In the high-resolution mode, all of the sonar sensors 14 are powered (i.e., all channels are active), the amplitude scale of measurement is twenty-four bits, the sample rate is 1250 SPS (samples/second) and the date rate is 40 KB/SEC. Although these operational characteristics are the same as the prior art Legacy system, the high-resolution mode is implemented for periods of ten seconds for each target detected by low-resolution mode processing. In this example, ten targets are detected in a twenty-four hour period. This means high-resolution mode processing occurs for a total of 100 seconds in a twenty-four hour period. During each ten-second period in which high-resolution mode processing is implemented, the power consumption is 100% and the data rate is 40 KB/SEC. However, the total amount of data collected in the high-resolution mode is 3.9 MB. As a result of cycling between the low-resolution and high-resolution modes, only 65.6 MB of data is recorded and the total power consumption over a twenty-four hour period is 10.1% of the total power consumed by the Legacy system over a twenty-four hour period.

In an alternate embodiment, the sonar sensor array 10 performs an initial spectral analysis of the acoustic signals detected by the sonar sensors 14 during low-resolution mode processing in order to confirm high-resolution mode processing is warranted. In such an embodiment, the sonar sensor array 10 includes a spectrum analysis device that processes the acoustic signals received by the sonar sensors 14 and outputs a signal for input into the control circuit 30 wherein such signal indicates whether signal processing of the high-resolution mode is warranted.

The present invention provides many advantages and benefits. One advantage is the reduction in overall power consumption of the sonar sensor array; thereby, extending the lifetime of fixed capacity batteries. Another advantage is the significant reduction of the aggregate data bandwidth; thereby, resulting in relaxed data storage requirements and a decreased load on data processors or transmitters. Data having a low probability of containing signals of interest is either not recorded or is recorded at a reduced data rate; thereby, simplifying future data playback and processing tasks. As a result of the reduced amount of acquired data, lower bandwidth data-exfiltration techniques become viable.

It will be understood that many additional changes in the details, materials, steps and arrangement of parts, which have been herein described and illustrated in order to explain the nature of the invention, may be made by those skilled in the art within the principle and scope of the invention as expressed in the appended claims.

The foregoing description of the preferred embodiments of the invention has been presented for purposes of illustration and description only. It is not intended to be exhaustive nor to limit the invention to the precise form disclosed; and obviously many modifications and variations are possible in light of the above teaching. Such modifications and variations that may be apparent to a person skilled in the art are intended to be included within the scope of this invention as defined by the accompanying claims.

What is claimed is:

1. A sonar sensor array, comprising:
   a plurality of sonar sensors, wherein each sensor can be configured to a powered mode to detect acoustic signals and to a sleep mode in which the sensor receives no power and does not detect acoustic signals;
   a data acquisition device having a signal processor and a data storage device, wherein said signal processor is capable of sampling and digitizing the detected acoustic signals with the digitized signal data suitable for storage on the data storage device, said data acquisition device being configured to operate in a low-resolution mode of signal processing in which received acoustic signals are processed by said signal processor at reduced bandwidth and dynamic range, and then stored on the data storage device, and in a high-resolution mode of signal processing in which the received acoustic signals are processed by said signal processor at full signal bandwidth and dynamic range and then stored on the data storage; and
   a control circuit to configure said plurality of sonar sensors to the sleep mode and to the powered mode and to configure said data acquisition device to the low-resolution mode or to the high-resolution mode depending upon the amplitude level of the detected acoustic signals and whether the detected acoustic signals indicate the presence of a target.

2. The system according to claim 1 wherein said control circuit comprises an energy detector to detect the detected acoustic signals and to output a signal waveform representing the detected acoustic signals.

3. The system according to claim 2 wherein said control circuit further comprises circuitry to determine an amplitude level of the signal waveform and to compare the amplitude level to a predetermined threshold, and wherein said control circuit is capable of configuring said data acquisition device to the low-resolution mode and a predetermined number of sonar sensors to the sleep mode if the amplitude level is less than the threshold and to the high-resolution mode and said sonar sensors to the powered mode if the amplitude level is greater than the threshold.

4. The system according to claim 1 wherein said data acquisition device has a sleep mode wherein the sleep mode is activated by said control circuit and wherein said control circuit configures all of said sonar sensors to the sleep mode when said data acquisition device is configured to the sleep mode.

5. The system according to claim 4 wherein said control circuit includes programmable circuitry to maintain said sonar sensors and said data acquisition device in the sleep mode for a predetermined amount of time and subsequently to configure a predetermined number of said sensors to the powered mode and said data acquisition device to the low-resolution mode.

6. The system according to claim 5 wherein said control circuit is programmed to cycle said sonar sensors and said data acquisition device between the sleep mode and the low-resolution mode, wherein each occurrence of the sleep mode has a duration for a first predetermined amount of time and each occurrence of the low-resolution mode has a duration for a second predetermined amount of time.

7. The system according to claim 1 wherein said signal processor is capable of sampling acoustic signals received by said sonar sensors at a first sampling rate during the low-resolution mode and at a second sampling rate during the high-resolution mode.

8. The system according to claim 7 wherein said signal processor is capable of converting the sampled acoustic signals to digital signals, and wherein the signal processor is capable of compressing the amplitude scale of measurement of the sampled acoustic signals to a compounded resolution during the low-resolution mode.

9. A sensor array, comprising:
a plurality of sonar sensors, wherein each sensor can be configured to a powered mode in which said sensor receives power to enable detection of acoustic signals and can be configured to a sleep mode in which said sensor receives no power;
a data acquisition device comprising a signal processor and a data storage device, wherein said signal processor can sample and digitize the acoustic signals received by said sonar sensors with the digitized signal data stored on said data storage device, said data acquisition device being configured to operate in a high-resolution mode in which the acoustic signals received by the sonar sensors are processed by said signal processor at full signal bandwidth and dynamic range and then stored on said data storage device, said data acquisition device being able to be configured into a sleep mode wherein no acoustic signals are sampled, digitized and stored on the data storage device; and
a control circuit to configure said sonar sensors to the sleep mode and to configure said sonar sensors to the powered mode and to configure said data acquisition device to the sleep mode and to configure said data acquisition device to the high-resolution mode depending upon the amplitude level of the acoustic signals detected and whether the detected acoustic signals indicate the presence of a target.

10. The sonar array system according to claim 9 wherein said control circuit comprises an energy detector to detect acoustic signals received by said sonar sensors and output a signal waveform representing the detected acoustic signal.

11. The sonar array system according to claim 10 wherein said control circuit further comprises circuitry to determine an amplitude level of the signal waveform and compare the amplitude level to a threshold, and wherein the control circuit configures the data acquisition device to the sleep mode and all sonar sensors to the sleep mode if the amplitude level is less than the threshold and wherein the control circuit configures the data acquisition device to the high-resolution mode and all of the sonar sensors to the powered mode if the amplitude level is greater than the threshold.

12. The system according to claim 9 wherein said control circuit includes programmable circuitry capable of maintaining said sonar sensors and said data acquisition device in the sleep mode for a predetermined amount of time and subsequently capable of configuring said sonar sensors to the powered mode and said data acquisition device to the high-resolution mode.

13. The system according to claim 9 wherein said control circuit is programmed to cycle said sonar sensors and said data acquisition device between the sleep mode and the high-resolution mode, wherein each occurrence of the sleep mode has a duration of a first predetermined time and each occurrence of the high-resolution mode has a duration of a second predetermined time.

14. A method of operating a sonar array, said method comprising the steps of:
providing an array of sonar sensors, wherein each sensor can be configured to a powered mode in which the sensor receives electrical power to enable detection of acoustic signals and wherein each sensor can be configured to a sleep mode in which the sensor receives no electrical power and does not detect acoustic signals;
configuring a first predetermined number of sonar sensors in the powered mode and a second predetermined number of sonar sensors to the sleep mode;
providing a data acquisition device that comprises a signal processor and a data storage device and which is configured to operate in a low-resolution mode in which acoustic signals received by the sonar sensors are processed by the signal processor at reduced bandwidth and dynamic range, and then stored on the storage device, and which is configured to operate in a high-resolution in which the acoustic signals received by the sonar sensors are processed by the signal processor at full signal bandwidth and dynamic range and then stored on the data storage device;
detecting acoustic signals received by the powered sonar sensors;
determining if the detected acoustic signals have predetermined signal characteristics;
processing the acoustic signals received by the powered sonar sensors with the low-resolution mode to determine whether a target is present when the detected acoustic signals have the predetermined signal characteristics; and
configuring the second predetermined number of sonar sensors to the powered mode and processing the acoustic signals received by the powered sonar sensors with the high-resolution mode to determine whether a target signature is present if low-resolution mode processing determines a target is present.

15. The method according to claim 14 wherein the signal processor of the data acquisition device samples and digitizes the acoustic signals received by the sonar sensors, and wherein said step of processing the acoustic signals in the low-resolution mode comprises compressing an amplitude scale of measurement of sampled acoustic signals to a compounded resolution.

16. The method according to claim 14 wherein the high-resolution mode occurs at periodic intervals.

17. The method according to claim 14 said method further comprising the step of configuring all sonar sensors to a sleep mode of no power if the detected acoustic signal does not have the predetermined signal characteristics.

18. The method according to claim 14 wherein said step of detecting acoustic signals received by the powered sonar sensors comprises transforming the detected acoustic signals to a signal waveform and determining if the detected acoustic signals have predetermined signal characteristics comprises:

determining an amplitude level of the signal waveform; and comparing the amplitude level to a threshold.

\* \* \* \* \*